(12) United States Patent
Mori et al.

(10) Patent No.: US 6,730,407 B2
(45) Date of Patent: May 4, 2004

(54) SOLUBLE LUBRICATING SURFACE-TREATED STAINLESS STEEL SHEET WITH EXCELLENT SHAPABILITY FOR FUEL TANK AND METHOD FOR MANUFACTURING FUEL TANK

(75) Inventors: Yoichiro Mori, Futtsu (JP); Akihiro Miyasaka, Futtsu (JP); Hiroshi Kanai, Futtsu (JP); Ikuro Yamaoka, Futtsu (JP); Tsutomu Tawa, Osaka (JP); Chikako Kouda, Osaka (JP); Mitsuhiro Nishimura, Osaka (JP)

(73) Assignees: Nippon Steel Corporation, Tokyo (JP); Mitsui Takeda Chemicals, Inc., Tokyo (JP)

( * ) Notice: Subject to any disclaimer, the term of this patent is extended or adjusted under 35 U.S.C. 154(b) by 0 days.

(21) Appl. No.: 09/924,737

(22) Filed: Aug. 8, 2001

(65) Prior Publication Data

US 2002/0098367 A1 Jul. 25, 2002

(30) Foreign Application Priority Data

Aug. 9, 2000 (JP) ........................................ 2000-240595

(51) Int. Cl.⁷ .............................................. B32B 27/40
(52) U.S. Cl. ................................ 428/425.8; 428/423.1; 428/544; 428/545
(58) Field of Search ........................... 428/423.1, 425.8, 428/544, 545

(56) References Cited

U.S. PATENT DOCUMENTS

| | | | | |
|---|---|---|---|---|
| 4,859,649 A | * | 8/1989 | Bohnke et al. ............. | 502/439 |
| 6,383,309 B2 | * | 5/2002 | Hirata et al. ................ | 148/325 |

FOREIGN PATENT DOCUMENTS

| | | | |
|---|---|---|---|
| EP | 0 575 621 | | 12/1993 |
| EP | 0 841 388 | | 5/1998 |
| EP | 1 099 485 | | 5/2001 |
| JP | 57-61833 | | 12/1982 |
| JP | 06-145559 | * | 5/1994 |
| JP | 06-173037 | * | 6/1994 |
| JP | 10-183368 | | 7/1998 |

OTHER PUBLICATIONS

Patent Abstracts of Japan, vol. 18, No. 632 (C–1280), Dec. 2, 1994.

* cited by examiner

Primary Examiner—John M. Cooney, Jr.
(74) Attorney, Agent, or Firm—Kenyon & Kenyon

(57) ABSTRACT

A soluble lubricating surface-treated stainless steel sheet with excellent shapability for fuel tanks, comprising a substrate having on both surfaces or one surface thereof a soluble lubricating resin film. Preferably, the soluble lubricating resin film mainly comprises (A) an alkali-soluble polyurethane resin composition containing a carboxyl group or a sulfonic acid group within the molecule and having a glass transition point of 100° C. or more as a dry film and (B) a lubricating function-imparting agent in an amount of from 1 to 30% by mass based on the polyurethane composition.

16 Claims, 1 Drawing Sheet

SOLUBLE LUBRICATING SURFACE-TREATED STAINLESS STEEL SHEET WITH EXCELLENT SHAPABILITY FOR FUEL TANK AND METHOD FOR MANUFACTURING FUEL TANK

BACKGROUND OF THE INVENTION

1. Field of the Invention

The present invention relates to a soluble lubricating surface-treated stainless steel sheet with excellent shapability for fuel tanks, obtainable by forming a soluble lubricating film, and also relates to a method for manufacturing a fuel tank.

2. Description of the Related Art

The automobile fuel tank has a complicated shape in many cases and is required to have excellent processability (deep drawing property). Furthermore, the fuel tank is an important protective part of an automobile and therefore, as a matter of importance, the material used therefor must be a material which generates no corrosion product giving rise to the filter blocking, is free of any fear for formation of a corrosion hole and can be easily and stably welded. A Pb—Sn alloy plated steel sheet (see, Japanese Examined Patent Publication (Kokoku) No. 57-61833), which is a material having these various properties, is being widely used as the material for automobile fuel tanks. This material exhibits stable chemical properties against gasoline, excellent press shapability due to excellent lubricity brought by the plating, and good resistance welding property such as spot welding and seam welding. However, in recent years, an unleaded material is in demand in view of the load on the environment.

One fuel tank material containing no lead is an Al-base plated steel sheet. Al exhibits good corrosion resistance against gasoline, alcohol or organic acid resulting from deterioration of gasoline, because a stable oxide film is formed on the surface thereof. In producing a fuel tank using the Al plated steel sheet, the weldability and the processability are the problems. A treatment for improving these properties is proposed in Japanese Patent Application No. 8-287997.

On the other hand, a stainless steel sheet is a fuel tank material capable of satisfying the requirement for higher corrosion resistance demanded from the standpoint of eliminating the fear for a corrosion hole. The stainless steel sheet has both excellent corrosion resistance and good weldability and if it can be processed into a desired tank shape, the stainless steel sheet can be an excellent fuel tank material. However, the processability of the stainless steel sheet disadvantageously fails to cope with the complicated shape of fuel tanks in many cases.

The object of the present invention is to solve these problems and provide a soluble lubricating surface-treated stainless steel sheet with excellent shapability for fuel tanks, which is obtainable by coating a soluble lubricating film on both surfaces or one surface. The object of the present invention includes providing a method for producing a fuel tank.

SUMMARY OF THE INVENTION

The present inventors have made extensive investigations to solve the above-described problems and obtain a soluble lubricating surface-treated stainless steel sheet with excellent shapability for fuel tanks.

As a result, it has been found that the above-described objects can be attained by a stainless steel sheet obtained by coating a specific soluble lubricating resin film on both surfaces or one surface of an austenite-type stainless steel sheet, a ferrite-type stainless sheet or a two phase-type stainless steel sheet. The present invention has been accomplished based on this finding. More specifically, the soluble lubricating surface-treated stainless steel sheet with excellent shapability for fuel tanks according to the present invention is characterized in that the substrate stainless steel sheet is any one of an austenite-type stainless steel sheet, a ferrite-type stainless sheet and a two phase-type stainless steel sheet and on both surfaces or one surface thereof, a soluble lubricating resin film is formed.

The soluble lubricating surface-treated stainless steel sheet with excellent shapability for fuel tanks according to the present invention is characterized in that the substrate stainless steel sheet is any one of an austenite-type stainless steel sheet, a ferrite-type stainless sheet and a two phase-type stainless steel sheet and on both surfaces or one surface thereof, a soluble lubricating resin film mainly comprising (A) a soluble polyurethane resin composition containing a carboxyl group or a sulfonic acid group within the molecule and having a glass transition point of 100° C. or more as a dry film and (B) a lubricating function-imparting agent in an amount of 1 to 30% by mass based on the soluble polyurethane resin composition is formed. By coating with this soluble lubricating resin film, the obtained soluble lubricating surface-treated stainless steel sheet for fuel tanks can provide excellent shapability even under severe conditions in press molding such as deep drawing and ironing.

The soluble lubricating surface-treated stainless steel sheet with excellent shapability for fuel tanks according to the present invention is characterized in that the substrate stainless steel sheet is any one of an austenite-type stainless steel sheet, a ferrite-type stainless steel sheet and a two phase-type stainless steel sheet and on both surfaces or one surface thereof, a soluble lubricating resin film mainly comprising (A) a soluble polyurethane resin composition containing a carboxyl group or a sulfonic acid group within the molecule and having a glass transition point of 100° C. or more as a dry film, (B) a lubricating function-imparting agent in an amount of from 1 to 30% by mass based on said soluble polyurethane resin composition and (C) silica particles in an amount of 1 to 30% by mass based on said soluble polyurethane resin composition is provided. By adding silica particles within the above-described range, the adhesive property between the soluble lubricating resin film and the stainless steel surface is improved and furthermore, the alkali-soluble lubricating film is improved in the film strength and in the galling resistance.

The soluble lubricating surface-treated stainless steel sheet with excellent shapability for fuel tanks according to the present invention is characterized in that the amount of an acid group contained in the soluble polyurethane resin composition constituting the soluble lubricating film is from 30 to 180 in terms of an acid value. By introducing a compound having in the polyurethane molecule an acid group in an amount of 30 to 180 as an acid value, the coating can have adhesive property to stainless steel and thereby follow the molding even under severe molding conditions despite the fact that the glass transition temperature of the dry film is 100° C. or more.

The soluble lubricating surface-treated stainless steel sheet with excellent shapability for fuel tanks according to the present invention is characterized in that the neutralizer for the acid group contained in (A) the soluble polyurethane resin composition for forming a soluble lubricating resin film is sodium hydroxide or potassium hydroxide. Since the neutralizing agent for acid group is sodium hydroxide or potassium hydroxide, the solubility necessary in the present invention can be achieved.

The term "soluble lubricating resin composition" means that the composition can be formed into an aqueous solution, emulsion or dispersion to coat the composition on a stainless sheet and the composition after it is coated and dried can have a lubricating property and can be solved with an alkali degreasing solution or hot water, for example, so that the composition can be removed from the surface of the stainless sheet.

The soluble lubricating surface-treated stainless steel sheet with excellent shapability for fuel tanks according to the present invention is characterized in that the main component constituting (A) the soluble polyurethane aqueous composition for forming a soluble lubricating resin film is polyester polyol. Since the main component constituting (A) the soluble polyurethane aqueous composition is polyester polyol, the solubility necessary in the present invention can be achieved even at low temperatures such as room temperature.

The soluble lubricating surface-treated stainless steel sheet with excellent shapability for fuel tanks according to the present invention is characterized in that the main component constituting (A) the soluble polyurethane aqueous composition for forming a soluble lubricating resin film is polyether polyol. Since the main component constituting (A) the soluble polyurethane aqueous composition is polyether polyol, the coating can have flexibility capable of following the molding even under severe molding conditions despite the fact that the glass transition temperature of the dry film is 100° C. or more.

The soluble lubricating surface-treated stainless steel sheet with excellent shapability for fuel tanks according to the present invention is characterized in that the lubricating function-imparting agent (B) for forming the soluble lubricating film comprises one or more members selected from the group consisting of polyolefin-based wax, fluorine-containing wax, paraffin-based wax and stearic acid-based wax. By the addition of this lubricating function-imparting agent, a low coefficient of dynamic friction is ensured over a wide temperature range and good lubricating performance can be obtained.

The soluble lubricating surface-treated stainless steel sheet with excellent shapability for fuel tanks according to the present invention is characterized in that the substrate is an austenite-type stainless steel sheet comprising, in % by mass, C: 0.5% or less, Si: 5% or less, Mn: 15% or less, P: 0.1% or less, S: 0.05% or less, Ni: 6 to 20%, Cr: 15 to 30%, N: 0.5% or less, and Al: 0.001 to 5% with the balance consisting of Fe and inevitable impurities. On considering the performance as the tank material, such as corrosion resistance and processability, and the production cost, an austenite-type stainless steel sheet comprising the components satisfying the above-described range is preferred.

The soluble lubricating surface-treated stainless steel sheet with excellent shapability for fuel tanks according to the present invention is characterized in that the substrate is a ferrite-type stainless steel sheet comprising, in % by mass, C: 0.5% or less, Si: 3% or less, Mn: 5% or less, P: 0.1% or less, S: 0.05% or less, Ni: 5% or less, Cr: 9 to 30%, N: 0.2% or less, and Al: 0.001 to 5% with the balance consisting of Fe and inevitable impurities. On considering the performance as the tank material, such as corrosion resistance and processability, and the production cost, a ferrite-type stainless steel sheet comprising the components satisfying the above-described range is preferred.

The soluble lubricating surface-treated stainless steel sheet with excellent shapability for fuel tanks is characterized in that the substrate is a two phase-type stainless steel sheet comprising, in % by mass, C: 0.5% or less, Si: 5% or less, Mn: 15% or less, P: 0.1% or less, S: 0.05% or less, Ni: 2 to 20%, Cr: 12 to 30%, N: 0.5% or less, and Al: 0.001 to 5% with the balance consisting of Fe and inevitable impurities. On considering the performance as the tank material, such as corrosion resistance and processability, and the production cost, a two phase-type stainless steel sheet comprising the components satisfying the above-described range is preferred.

The soluble lubricating surface-treated stainless steel sheet with excellent shapability for fuel tanks according to the present invention is characterized in that the substrate stainless steel sheet, which is any one of austenite-type stainless steel sheet, ferrite-type stainless steel sheet and two phase-type stainless steel sheet, further contains one or more of, in % by mass, Mo: 0.01 to 8%, Cu: 0.01 to 5%, Ti: 0.01 to 1%, Nb: 0.01 to 1%, V: 0.01 to 1%, Mg: 0.001 to 0.1%, Ca: 0.001 to 0.1%, B: 0.0005 to 0.05% and W: 0.01 to 5%.

DETAILED DESCRIPTION OF THE INVENTION

Figure 1A:
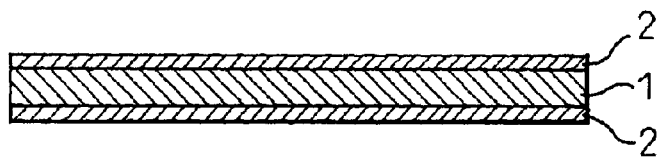
FIGS. 1A to 1D are views showing the process of manufacturing a fuel tank from a stainless steel sheet according to the present invention.

As a result of extensive investigations on the surface-treated stainless steel sheet with excellent shapability for fuel tanks, the present inventors have found that the above-described performance can be satisfied by a soluble lubricating surface-treated stainless steel sheet obtained by coating a soluble lubricating resin film as the surface layer on both surfaces or one surface of an austenite-type stainless steel sheet, a ferrite-type stainless steel sheet or a two phase-type stainless steel sheet. Examples of the soluble lubricating resin film include a polyethylene glycol-based film, a polypropylene glycol-based film, a polyvinyl alcohol-based film, an acrylic film, a polyester-based film and a polyurethane-based film. For forming a soluble film, the resin must be a resin water dispersion or a water-soluble resin.

Examples of the polyethylene glycol-based film include, in view of the film-forming property, polyethylene glycol and modified polyethylene glycol each having an average molecular weight of 3,000 or more. Examples of the modified polyethylene glycol include isocyanate-modified polyethylene glycol and epoxy-modified polyethylene glycol.

Examples of the polypropylene glycol-based film include, in view of the film-forming property, polypropylene glycol and modified polypropylene glycol each having an average molecular weight of 3,000 or more. Examples of the modified polypropylene glycol include isocyanate-modified polypropylene glycol and epoxy-modified polypropylene glycol.

Examples of the polyvinyl alcohol-based film include completely saponified polyvinyl alcohol, partially saponified polyvinyl alcohol and modified polyvinyl alcohol. Examples of the modified polyvinyl alcohol include carboxyl group-modified polyvinyl alcohol, sulfonic acid-modified polyvinyl alcohol and acetoacetyl group-modified polyvinyl alcohol.

Examples of the acrylic film include copolymers of an acrylic acid, a methacrylic acid, an acrylic acid ester, a methacrylic acid ester, maleic acid or itaconic acid. Examples of the acrylic acid ester include methyl acrylate, ethyl acrylate, isopropyl acrylate, n-butyl acrylate, 2-ethylhexyl acrylate, 2-hydroxyethyl acrylate, hydroxypropyl acrylate, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate and hydroxypropyl methacrylate. Examples of the copolymer include styrene, acrylamide, vinyl acetate and acrylonitrile.

Examples of the polyester-based film include those obtained by the condensation polymerization of a polyhydric alcohol and a polybasic acid. Examples of the polyhydric alcohol constituting the polyester include ethylene glycol, propylene glycol, 1,3-butylene glycol, 1,6-hexanediol, diethylene glycol, dipropylene glycol, neopentyl glycol and triethylene glycol. Examples of the polybasic acid include phthalic acid anhydride, terephthalic isophthalate, succinic acid anhydrate, adipic acid, azelaic acid, sebacic acid, fumaric acid, itaconic acid and maleic acid anhydride.

Examples of the polyurethane-based film include those obtained by the reaction between a polyol such as polyester polyol, polyether polyol or polycarbonate polyol, with an aromatic, aromatic aliphatic, aliphatic or alicyclic diisocyanate.

For the soluble lubricating resin, various resins may be used, however, in order to form a soluble lubricating resin film capable of attaining excellent shapability even under severe press molding conditions such as deep drawing or ironing, a lubricating resin film formed using a soluble polyurethane resin composition is particularly effective. The soluble polyurethane resin composition constituting the soluble lubricating resin film coated as the surface layer of the soluble lubricating surface-treated stainless steel sheet for fuel tanks is described in detail below.

The soluble polyurethane resin composition for use in the present invention, which contains a carboxyl group or a sulfonic acid group within the molecule and forms a film having, as a dry film, a glass transition temperature of 100° C. or more, can be obtained by reacting a compound having at least two isocyanate groups per one molecule, a compound having at least two active hydrogen groups per one molecule and a compound having at least one active hydrogen group within the molecule and at the same time, containing an acid group such as carboxyl group and sulfonic acid group, and dissolving or dispersing the reaction product in water.

Examples of the compound having at least two isocyanates groups per one molecule, which can be used in the present invention, include polyisocyanate monomers, for example, aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanate methyl caproate, alicyclic diisocyanates such as 1,3-cyclopentane diisocyanate, 1,4-cyclohexane diisocyanate, 1,3-cyclohexane diisocyanate, 3-isocyanatemethyl-3,5,5-trimethylcyclohexyl isocyanate, 4,4'-methylenebis (cyclohexyl isocyanate), methyl-2,4-cyclohexane diisocyanate, methyl-2,6-cyclohexane diisocyanate, 1,4-bis (isocyanate methyl)cyclohexane, 1,3-bis(isocyanate methyl) cyclohexane and norbornene diisocyanate, aromatic diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate and a mixture thereof, 4,4'-toluidine diisocyanate, dianisidine diisocyanate and 4,4'-diphenyl ether diisocyanate, aromatic aliphatic diisocyanates such as 1,3- or 1,4-xylylene diisocyanate and a mixture thereof, ω,ω'-diisocyanate-1,4-diethylbenzene, 1,3- or 1,4-bis(1-isocyanate-1-methylethyl)benzene and a mixture thereof, triisocyanates such as triphenylmethane-4,4',4"-triisocyanate(?), 1,3,5-triisocyanate benzene, 2,4,6-triisocyanate toluene and 1,3,5-triisocyanate hexane, and tetraisocyanates such as 4,4'-diphenyldimethylethane-2,2',5, 5'-tetraisocyanate; polyisocyanates having a 2,4,6-oxadiazinetrione ring, obtained from the above-described polyisocyanate monomer and a dimer, trimer, biuret, allophanate, carbodiimide or carbonic acid gas derived from the above-described polyisocyanate monomer, for example, adducts of a low molecular weight polyol having a molecular weight of less than 200 to the above-described polyisocyanate monomer, such as ethylene glycol, propylene glycol, butylene glycol, 1,6-hexane glycol, neopentyl glycol, 3-methyl-1,5-pentanediol, 3,3-dimethylolheptane, cyclohexanedimethanol, diethylene glycol, triethylene glycol, dipropylene glycol, glycerol, trimethylolpropane, pentaerythritol and sorbitol, and adducts to the above-described polyisocyanate monomer, such as polyester polyol having a molecular weight of 200 to 200,000, polyether polyol, polyether ester polyol, polyesteramide polyol, polycaprolactone polyol, polyvalerolactone polyol, acryl polyol, polycarbonate polyol, polyhydroxyalkane, castor oil and polyurethane polyol.

These various compounds having an isocyanate group may be used, however, in order to attain a sufficiently high processability with a glass transition temperature of 100° C. or more, an aromatic, aromatic aliphatic or alicyclic isocyanate compound is preferably used and reacted.

With respect to the compound having at least two active hydrogen groups per one molecule, examples of the compound having active hydrogen include compounds having an amino group, a hydroxyl group or a mercapto group. Among these, in view of the reaction rate with isocyanate group and the mechanical properties after the coating, compounds having a hydroxyl group are preferred. In the compound having active hydrogen group, the number of functional groups is preferably from 2 to 6, more preferably from 2 to 4, from the standpoint of keeping good mechanical properties of the coating. The molecular weight of the compound having an active hydrogen group is, in view of the concentration of urethane bond affecting the performance of the finally obtained coating or the workability in the production, preferably from 200 to 10,000, more preferably from 300 to 5,000.

Examples of the compound where the active hydrogen is a hydroxyl group include polyester polyol, polyether polyol, polyether ester polyol, polyesteramide polyol, acryl polyol, polycarbonate polyol, polyhydroxyalkane, castor oil, polyurethane polyol and a mixture thereof. For the purpose of controlling the urethane group concentration and thereby optimizing the properties of the coating, a low molecular weight polyol having a molecular weight of 62 to 200, other than the above-described polyol, may further be mixed. Specific examples of the low molecular weight polyol include glycols used in the production of polyester polyol, such as ethylene glycol, propylene glycol, 1,3-propanediol, 1,4-butanediol, 1,5-pentanediol, 1,6-hexanediol, 1,9-nonanediol, 1,8-nonanediol, neopentyl glycol, 2-methylpentandiol, 3-methylpentanediol, 3,3-dimethylolheptane, 2,2,4-trimethyl-1,3-pentanediol, 2,4-diethyl-1,5-pentanediol, diethylene glycol, dipropylene glycol, 1,4-cyclohexanediol and 1,4-cyclohexanedimethanol; and compounds such as glycerin, trimethylolpropane and pentaerythritol.

These various compounds having an active hydrogen group may be used, however, in order to attain solubility in an alkaline degreasing solution at a low temperature such as room temperature, polyester polyol and polyurethane polyol constituted by polyester polyol are preferred. Furthermore, in order to obtain a coating having flexibility capable of following the molding even under severe molding conditions despite the fact that the glass transition temperature of the dry film is 100° C. or more, polyether polyol and polyurethane polyol constituted by polyether polyol are preferred.

Examples of the compound having at least one active hydrogen group within the molecule and at the same time, having an acid group such as carboxyl group or sulfonic acid group include sulfonic acid-containing compounds, their derivatives and polyester polyols obtained by the copolymerization thereof, such as 2-oxyethanesulfonic acid, phenolsulfonic acid, sulfobenzoic acid, sulfosuccinic acid, 5-sulfoisophthalic acid, sulfanyl acid, 1,3-phenylenediamine-4,6-disulfonic acid and 2,4-diaminotoluene-5-sulfonic acid; carboxyl group-containing compounds, their derivatives and polyester polyols obtained by the copolymerization thereof, such as 2,2-dimethylolpropionic acid, 2,2-dimethylolbutyric acid, 2,2-dimethylolvaleric acid, dioxymaleic acid, 2,6-dioxybenzoic acid and 3,4-diaminobenzoic acid; and carboxyl group-containing compounds obtained by the reaction of a compound having an anhydrous group, such as maleic anhydride, phthalic anhydride, succinic anhydride, trimellitic anhydride and pyromellitic anhydride, with a compound having an active hydrogen group, and their derivatives.

For introducing a carboxyl group or sulfonic acid group into the alkali-soluble polyurethane resin composition, at least one of the above-described acid group-containing compounds may be copolymerized at the production of the polyurethane prepolymer or may be reacted at the chain elongation reaction. The acid group is introduced into the polyurethane molecule within the acid value range of 30 to 180, whereby although the glass transition temperature of the dry film is 100° C. or more, the coating can have adhesive property to stainless steel and thereby follow the molding even under severe molding conditions.

In order to satisfactorily dissolve or disperse the alkali-soluble polyurethane resin composition in water, a neutralizer is used to neutralize the carboxyl group or sulfonic acid group in the polyurethane resin composition.

Examples of the neutralizer which can be used include basic substances, for example, tertiary amines such as ammonia, triethylamine, triethanolamine, triisopropanolamine, trimethylamine and dimethylethanolamine, and alkali metal hydroxides such as sodium hydroxide and potassium hydroxide. These may be used individually or in combination of two or more thereof. The neutralizer may be added directly to the polyurethane prepolymer or may be added to water when the composition is dissolved or dispersed in the water. The amount of the neutralizer added is from 0.1 to 2.0 equivalents, preferably from 0.3 to 1.3 equivalents, based on the hydrophilic group.

In order to attain the good alkali-solubility required in the present invention, sodium hydroxide or potassium hydroxide is preferably contained as the neutralizer.

Furthermore, in order to more improve the dissolving or dispersing property of the alkali-soluble polyurethane resin composition in water, a surfactant or the like may be used.

In synthesizing the polyurethane prepolymer, an organic solvent may also be used. In the case of using an organic solvent, specific examples thereof include acetone, methyl ethyl ketone, ethyl acetate, acetonitrile and N-methylpyrrolidone. The amount of the organic solvent is preferably on the order of 3 to 50% by mass based on the reaction raw materials.

The polyurethane prepolymer is dissolved or dispersed in water using a homogenizer, a mixer or the like. At this time, the temperature is preferably on the order from room temperature to 70° C. so as to prevent the evaporation of the basic substance which is neutralizing the hydrophilic group or to ensure workability. At the dispersion in a medium such as water, the concentration of the polyurethane resin composition is preferably from 10 to 50% by mass so as to prevent the excessive elevation of viscosity and keep the storage stability.

Also, another chain-elongating agent may be reacted to increase the molecular weight. The chain-elongating agent used may be, for example, a known polyamine compound. Examples of the polyamine compound include diamines such as ethylenediamine, 1,2-propanediamine, 1,6-hexamethylenediamine, piperazine, 2,5-dimethylpiperazine, isophorondiamine, 4,4'-dicyclohexylmethanediamine, 3,3'-dimethyl-4,4'-dicyclohexylmethanediamine and 1,4-cyclohexanediamine; polyamines such as diethylenetriamine, dipropylenetriamine, triethylenetetramine and tetraethylenepentamine; compounds having an amino group and a hydroxyl group, such as hydroxyethylhydrazine, hydroxyethyldiethylenetriamine, 2-[(2-aminoethyl)amino]ethanol and 3-aminopropanediol; hydrazines; and acid hydrazides. These polyamine compounds may be used individually or in a combination of two, or more thereof.

The alkali-soluble polyurethane resin composition according to the present invention may contain, if desired, a film formation aid, a leveling agent, a defoaming agent and a weather resistant stabilizer.

The lubricating function-imparting agent is described below.

The lubricating function-imparting agent has an action of reducing the coefficient of friction on the surface to impart higher lubricity and thereby preventing galling and the like to improve the processability in press molding or ironing. The lubricating function-imparting agent may be any insofar as it imparts a lubricating performance to the obtained film, but preferably comprises one or more selected from polyolefin-based wax (e.g., polyethylene, polypropylene), fluorine-containing wax (e.g., polytetrafluoroethylene, polychlorotrifluoroethylene, polyvinylidene fluoride, polyvinyl fluoride), paraffin-based wax and stearic acid-based wax.

The granulated lubricating function-imparting agent preferably has an average particle size of 10 $\mu$m or less. If the average particle size exceeds 10 $\mu$m, the film loses the continuity and uniformity and this gives rise to reduction in the adhesion of the lubricating film to the substrate steel sheet, reduction in the adhesion of a coating material, separation of the lubrication-imparting agent and moreover, reduction in the storage stability as a coating material composition. The average particle size of the lubricating function-imparting agent is preferably from 0.5 to 6 μm. The amount of the lubricating function-imparting agent added is preferably from 1 to 30% by mass based on the solid contents of the soluble polyurethane resin composition. If the amount added is less than 1%, the required lubricating effect cannot be obtained, whereas if it exceeds 30% by mass, the film strength may decrease or separation of the lubrication-imparting agent may disadvantageously occur. The content of the lubricating function-imparting agent is more preferably from 5 to 20% by mass.

Silica is added in the case of improving the film strength or the adhesive property to the substrate surface. The silica particle may be any silica particle such as water dispersion colloidal silica, pulverized silica and vapor phase silica. For bringing out the processability or corrosion resistance of the film, the primary particle size is preferably from 2 to 30 nm and the secondary aggregate particle size is preferably 100 nm or less. The amount added of silica is preferably from 1 to 30% by mass based on the solid contents of the polyurethane resin composition. If the amount added is less than 1%, a sufficiently high effect of improving the corrosion resistance cannot be obtained and the adhesion to the lower layer cannot be satisfactorily enhanced, whereas if it exceeds 30%, the film is less stretched and therefore, the processability decreases to readily generate galling.

The soluble lubricating resin film for covering the soluble lubricating surface-treated stainless steel sheet for fuel tanks of the present invention may contain, in addition to the components (A), (B) and (C), a pigment for imparting a design property, an electrically conducting additive for imparting electrical conductivity, a thickening agent, a defoaming agent, a dispersant, a desiccating agent, a stabilizer, an antiskinning agent, an antifungal agent, an antiseptic agent, an atnifreezing agent and the like according to the purpose within the range of not reducing the physical properties of resin.

The thickness of the soluble lubricating resin film covering the soluble lubricating surface-treated stainless steel sheet for fuel tanks of the present invention is preferably from 0.5 to 10 μm. If the thickness is less than 0.5 μm, scratches reaching the plating layer cannot be prevented due to a pressure imposed at the working and at the same time, the required processability cannot be obtained due to sliding, whereas if the thickness exceeds 10 μm, generation of powder dropped out from the coating increases and the metal mold must be cleaned on many occasions to decrease the productivity. The lubricating resin film covering the lubricating surface-treated stainless steel sheet for fuel tanks of the present invention is coated on both surfaces or on one surface according to the use.

The soluble lubricating resin film covering the soluble lubricating surface-treated stainless steel sheet for fuel tanks of the present invention may be formed by coating the composition using a conventionally known method such as roll coater application or spray coating, and then baking the coating.

In the present invention, the substrate may be treated with phosphate or chromate so as to increase the corrosion resistance and the adhesive property. In this case, the chromate treatment is any one of electrolysis-type chromate treatment, reaction-type chromate treatment and coating-type chromate treatment. The chromate film is preferably formed by coating a chromate solution prepared by adding silica, phosphoric acid and at least one hydrophilic resin to reduced chromic acid, and drying the solution.

The amount of phosphate attached is from 0.5 to 3.5 $g/m^2$ in terms of phosphate and the amount of chromate attached is, in terms of metal chromium, preferably from 5 to 150 $mg/m^2$, preferably from 10 to 50 $mg/m^2$. If the amount attached is less than 5 $mg/m^2$, an excellent anticorrosion effect cannot be obtained, whereas if it exceeds 150 $mg/m^2$, the processability is deteriorated and, for example, the chromate film undergoes cohesive failure during shaping. According to the purpose, the substrate may further be subjected to an acid washing treatment, an alkali treatment, an electrolytic reduction treatment, a cobalt plating treatment, a nickel plating treatment, a silane coupling treatment or an inorganic silicate treatment. In the soluble lubricating surface-treated stainless steel sheet for fuel tanks of the present invention, a lubricating oil or a lubricating and rust-preventing oil may further be coated as the upper layer of the soluble lubricating resin film. The lubricating oil or lubricating and rust-preventing oil, however, preferably does not swell or dissolve the soluble lubricating resin film.

In the soluble lubricating surface-treated stainless steel sheet with excellent shapability for fuel tanks according to the present invention, the austenite-type stainless steel sheet used as the substrate preferably comprises, in % by mass, C: 0.5% or less, Si: 5% or less, Mn: 15% or less, P: 0.1% or less, S: 0.05% or less, Ni: 6 to 20%, Cr: 15 to 30%, N: 0.5% or less and Al: 0.001 to 5%, with the balance being Fe and inevitable impurities. By satisfying this range, the performance as the tank material, such as corrosion resistance and processability, and the production cost can be satisfied.

In the soluble lubricating surface-treated stainless steel sheet with excellent shapability for fuel tanks according to the present invention, the ferrite-type stainless steel sheet used as the substrate preferably comprises, in % by mass, C: 0.5% or less, Si: 3% or less, Mn: 5% or less, P: 0.1% or less, S: 0.05% or less, Ni: 5% or less, Cr: 9 to 30%, N: 0.2% or less and Al: 0.001 to 5%, with the balance being Fe and inevitable impurities. By satisfying this range, the performance as the tank material, such as corrosion resistance and processability, and the production cost can be satisfied.

In the soluble lubricating surface-treated stainless steel sheet with excellent shapability for fuel tanks according to the present invention, the two phase-type stainless steel sheet used as the substrate preferably comprises, in % by mass, C: 0.5% or less, Si: 5% or less, Mn: 15% or less, P: 0.1% or less, S: 0.05% or less, Ni: 2 to 20%, Cr: 12 to 30%, N: 0.5% or less and Al: 0.001 to 5%, with the balance being Fe and inevitable impurities. By satisfying this range, the performance as the tank material, such as corrosion resistance and processability, and the production cost can be satisfied.

In the soluble lubricating surface-treated stainless steel sheet with excellent shapability for fuel tanks according to the present invention, the substrate stainless steel sheet, which is any one of austenite-type stainless steel sheet, ferrite-type stainless steel sheet and two phase-type stainless steel sheet, may further contain one or more member of, in % by mass, Mo: 0.01 to 8%, Cu: 0.01 to 5%, Ti: 0.01 to 1%, Nb: 0.01 to 1%, V: 0.01 to 1%, Mg: 0.001 to 0.1%, Ca: 0.001 to 0.1%, B: 0.0005 to 0.05% and W: 0.01 to 5%.

After the coating of the soluble lubricating resin film, the soluble lubricating surface-treated stainless steel sheet of the present invention is subjected to molding such as press molding, deep drawing or ironing. Even when such severe processing is applied, by virtue of excellent processability and lubricity of the soluble lubricating resin film of the present invention, sufficiently high shapability can be obtained and scratching or galling on the steel sheet surface can be prevented.

After the soluble lubricating surface-treated stainless steel sheet covered with the soluble lubricating resin film of the present invention is mold-processed as such, the lubricating resin film may be removed by a treatment with an alkali, hot water or a solvent. Furthermore, after the removal of the soluble lubricating resin film, the stainless steel sheet of the present invention can be welded to produce a fuel tank. The soluble lubricating resin film of the present invention has good solubility and therefore, causes no adverse effect at the welding.

The formation of a lubricating film of a soluble lubricating surface-treated stainless steel sheet coated with a soluble lubricating resin film of the present invention, the mold processing, the removal of the lubricating resin film and the production of a fuel tank by welding are described below by referring to FIGS. 1A to 1D. The soluble lubricating resin film 2 of the present invention is coated on a stainless steel sheet 1 to prepare a soluble lubricating surface-treated stainless steel sheet (see, FIG. 1A). This stainless steel sheet covered with a soluble lubricating resin film is, for example, deep-drawn to obtain a molded article 3.

Figure 1B:
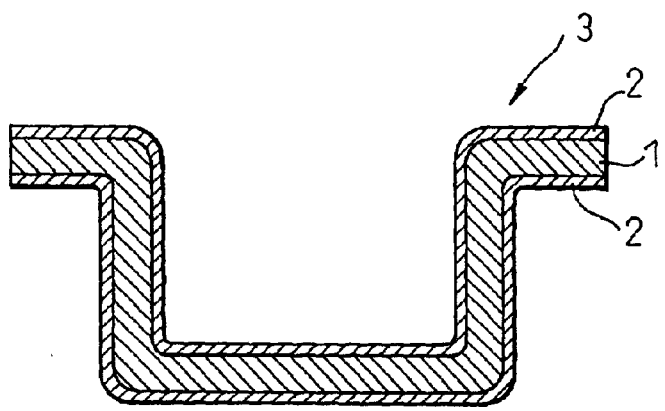

This molded article comprises a stainless steel sheet 1 and a lubricating resin film 2 and scratches and galling are not observed on the steel sheet 1 (see, FIG. 1B).

Figure 1C:
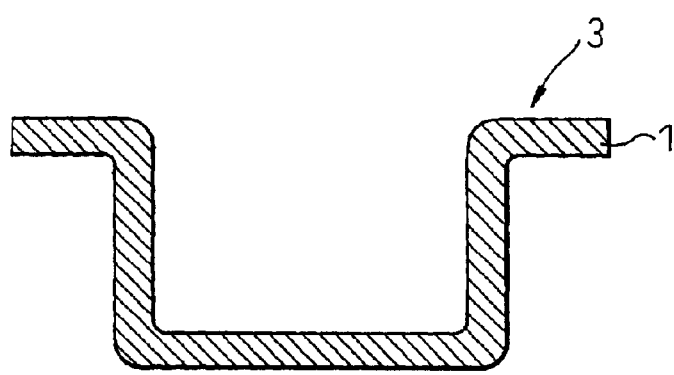
Figure 1D:
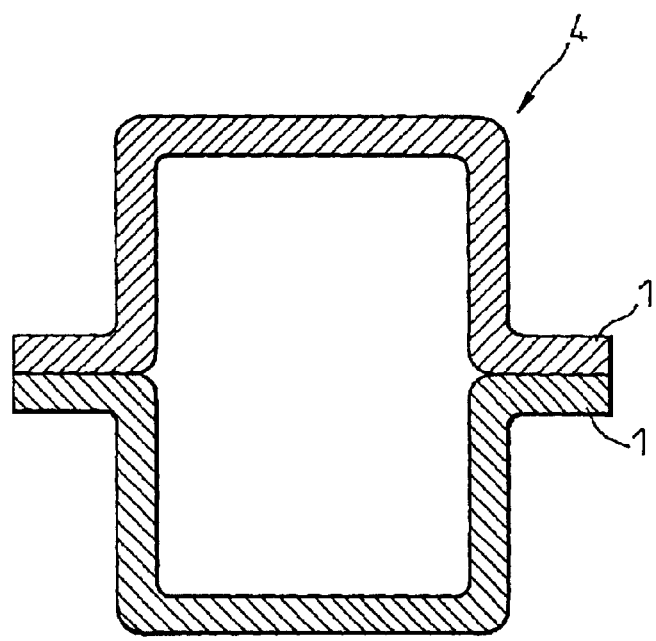

After the mold processing, the molded article 3 was treated with an alkali solution or hot water using a spray method or a dipping method to remove the lubricating resin film 2 (see, FIG. 1C). Thereafter, the molded article 3 from which the lubricating film is removed is welded to manufacture a fuel tank 4 (FIG. 1D).

EXAMPLES

The present invention is described below by referring to Examples.

1. Tested Materials

Stainless steel sheets each having a constituent construction shown in Table 1 were used as the original plate of the soluble lubricating surface-treated stainless steel sheet for fuel tanks of the present invention.

2. Production of Soluble Polyurethane Aqueous Composition

Production Example 1

To four-neck flask equipped with a stirrer, a Dimroth condenser, a nitrogen inlet, a silica gel dry pipe and a thermometer, 87.11 g of 3-isocyanatemethyl-3,5,5-trimethylcyclohexylisocyanate, 31.88 g of 1,3-bis(1-isocyanate-1-methylethyl)benzene, 41.66 g of dimethylolpropionic acid, 4.67 g of triethylene glycol, 62.17 g of polyester polyol with a molecular weight of 2,000 comprising adipic acid, neopentyl glycol and 1,6-hexanediol, and 122.50 g of acetonitrile as a solvent were added. After elevating the temperature to 70° C., the mixture was stirred for 4 hours in a nitrogen atmosphere and by confirming that a predetermined amine equivalent was reached, an acetonitrile solution of polyurethane prepolymer was obtained. Thereafter, 346.71 g of the obtained polyurethane prepolymer solution was dispersed in an aqueous solution containing 12.32 g of sodium hydroxide dissolved in 639.12 g of water using a homodisperser and thereby formed into an emulsion. To this polyurethane emulsion, 12.32 g of 2-[(2-aminoethyl)amino]ethanol diluted with 110.88 g of water was added and allowed to cause a chain elongation reaction.

Subsequently, the acetonitrile used in the synthesis of polyurethane prepolymer was removed by distillation at 50° C. under reduced pressure of 150 mmHg to obtain substantially solventless Polyurethane Emulsion A having an acid value of 69, a solid concentration of 25% and a viscosity of 30 mpa.s.

Production Example 2

To four-neck flask equipped with a stirrer, a Dimroth condenser, a nitrogen inlet, a silica gel dry pipe and a thermometer, 132.49 g of 3-isocyanatemethyl-3,5,5-trimethylcyclohexylisocyanate, 48.49 g of 1,3-bis(1-isocyanate-1-methylethyl)benzene, 57.09 g of dimethylolpropionic acid, 10.61 g of triethylene glycol, 141.31 g of polyester polyol comprising adipic acid, neopentyl glycol and 1,6-hexanediol and having a molecular weight of 2,000, and 210.00 g of acetone as a solvent were added. After elevating the temperature to 50° C., the mixture was stirred for 7 hours in a nitrogen atmosphere and by confirming that a predetermined amine equivalent was reached, an acetone solution of polyurethane prepolymer was obtained. Thereafter, 485.97 g of the obtained polyurethane prepolymer solution was dispersed in an aqueous sodium hydroxide solution containing 13.80 g of sodium hydroxide dissolved in 667.12 g of water using a homodisperser and thereby formed into an emulsion. To this polyurethane emulsion, 15.32 g of 2-[(2-aminoethyl)amino]ethanol diluted with 137.88 g of water was added and allowed to cause a chain elongation reaction. Subsequently, the acetone used in the synthesis of polyurethane prepolymer was removed by distillation at 50° C. under reduced pressure of 150 mmHg to obtain substantially solventless Polyurethane Emulsion B having an acid value of 56, a solid concentration of 30% and a viscosity of 100 mPa.s.

Production Example 3

To four-neck flask equipped with a stirrer, a Dimroth condenser, a nitrogen inlet, a silica gel dry pipe and a thermometer, 120.69 g of 3-isocyanatemethyl-3,5,5-trimethylcyclohexylisocyanate, 44.17 g of 1,3-bis(1-isocyanate-1-methylethyl)benzene, 47.06 g of dimethylolpropionic acid, 12.44 g of triethylene glycol, 165.65 g of polyester polyol comprising adipic acid, neopentyl glycol and 1,6-hexanediol and having a molecular weight of 2,000, and 210.00 g of acetonitrile as a solvent were added. After elevating the temperature to 70° C., the mixture was stirred for 5 hours in a nitrogen atmosphere and by confirming that a predetermined amine equivalent was reached, an acetonitrile solution of polyurethane prepolymer was obtained. Thereafter, 491.37 g of the obtained polyurethane prepolymer solution was dispersed in an aqueous sodium hydroxide solution containing 11.50 g of sodium hydroxide dissolved in 678.01 g of water using a homodisperser and thereby formed into an emulsion. To this polyurethane emulsion, 14.11 g of 2-[(2-aminoethyl)amino]ethanol diluted with 126.99 g of water was added and allowed to cause a chain elongation reaction. Subsequently, the acetone used in the synthesis of polyurethane prepolymer was removed by distillation at 50° C. under reduced pressure of 150 mmHg to obtain substantially solventless Polyurethane Emulsion C having an acid value of 47, a solid concentration of 30% and a viscosity of 35 cps.

Production Example 4

To four-neck flask equipped with a stirrer, a Dimroth condenser, a nitrogen inlet, a silica gel dry pipe and a thermometer, 87.11 g of 3-isocyanatemethyl-3,5,5-trimethylcyclohexylisocyanate, 31.88 g of 1,3-bis(1-isocyanate-1-methylethyl)benzene, 41.66 g of dimethylolpropionic acid, 4.67 g of triethylene glycol, 62.17 g of polytetramethylene ether glycol having a molecular weight of 2,000 and 122.50 g of acetonitrile as a solvent were added. After elevating the temperature to 70° C., the mixture was stirred for 6 hours in a nitrogen atmosphere and by confirming that a predetermined amine equivalent was reached, an acetonitrile solution of polyurethane prepolymer was obtained. Thereafter, 346.71 g of the obtained polyurethane prepolymer solution was dispersed in an aqueous solution containing 12.32 g of sodium hydroxide dissolved in 639.12 g of water using a homodisperser and thereby formed into an emulsion. To this polyurethane emulsion, 12.32 g of 2-[(2-aminoethyl)amino]ethanol diluted with 110.88 g of water was added and allowed to cause a chain elongation reaction. Subsequently, the acetonitrile used in the synthesis of polyurethane prepolymer was removed by distillation at 50° C. under reduced pressure of 150 mmHg to obtain substantially solventless Polyurethane Emulsion D having an acid value of 69.0, a solid concentration of 25% by mass and a viscosity of 30 mPa.s.

3. Production of Soluble Lubricating Surface-treated Stainless Steel Sheet for Fuel Tanks

Example 1

| | |
|---|---|
| Soluble polyurethane aqueous composition obtained in Production Example 1 | 500 parts by weight |
| Solid Lubricant (Note 1) | 37 parts by weight (10*) (*amount added per 100 of urethane resin solid content) |

(Note 1)
Solid lubricant: Low-density polyethylene wax resin having a softening point or 110° C. and an average particle size of 2.5 μm, the solid content percentage: 40%

A lubricating film having this construction and having a compositional ratio shown in Table 1 was formed on the stainless steel sheet prepared above through coating by a bar coater and then baked and dried in a heating furnace at 180° C. while setting the temperature of the metal sheet to reach 80° C.

Examples 2 to 52 and Comparative Examples 1 to 7

Soluble lubricating surface-treated stainless steel sheets of Examples 2 to 52 were obtained in the same manner as in Example 1 except for changing the substrate stainless steel sheet and the soluble lubricating film composition as shown in Table 1.

In addition to the soluble polyurethane resin composition above, the soluble lubricating film was formed using:

Polyethylene glycol having a molecular weight of 20,000

Isocyanate-modified polyethylene glycol having a molecular weight of 60,000

Polypropylene glycol having a molecular weight of 20,000

Complete saponification-type polyvinyl alcohol

Acrylic resin comprising a mixture of acrylic acid/styrene/maleic acid

The silica used was colloidal silica having an average particle size of 10 to 20 nm, a pH of 8.6 and a heating residue of about 20%.

In comparative examples, only a lubricating oil (Wax #122, produced by Johnson) was coated on the stainless steel sheet.

4. Evaluation of Performance

The obtained samples were tested and evaluated on the performance as follows.

(1) Measurement of Glass Transition Temperature

The dynamic viscoelasticity was measured using a viscoelasticity spectrometer Model VHS (manufactured by Iwamoto Seisakusho) under the conditions such that the frequency was 10 Hz, the temperature elevating rate was 5.0° C./min, the sample length was 5 cm and the amplitude was 0.01 mm. The peak of tan δ was designated as the glass transition temperature.

(2) Measurement of Press Shapability

A molding test was performed using a hydraulic molding tester with a cylindrical punch under the following conditions and the limiting drawing ratio (LDR) and after the processing, the mold galling property by the appearance were evaluated. The evaluation was performed using two levels of temperature condition in the molding test, namely, at room temperature and elevated temperature (100° C.).

Punch size: 40 mmφ
Blank size: 68 to 97.5 mm

TABLE 1

| | Chemical Components (unit: %) | | | | | | | | | | |
|---|---|---|---|---|---|---|---|---|---|---|---|
| | C | Si | Mn | P | S | Ni | Cr | Mo | Cu | N | Tl |
| Austenite-type A | 0.019 | 0.38 | 0.88 | 0.028 | 0.003 | 9.58 | 18.09 | — | — | 0.038 | — |
| Austenite-type B | 0.018 | 0.44 | 0.85 | 0.026 | 0.001 | 12.26 | 17.21 | 2.82 | — | 0.035 | — |
| Austenite-type C | 0.033 | 1.43 | 1.07 | 0.028 | 0.001 | 6.85 | 17.17 | — | 2.23 | 0.060 | — |
| Austenite-type D | 0.028 | 1.85 | 0.69 | 0.021 | 0.015 | 10.03 | 17.87 | 0.64 | 2.09 | 0.045 | — |
| Ferrite-type E | 0.004 | 0.09 | 0.13 | 0.024 | 0.001 | — | 17.45 | 1.19 | — | 0.012 | — |
| Ferrite-type F | 0.010 | 0.50 | 0.35 | 0.024 | 0.007 | — | 11.05 | — | — | — | 0.23 |
| Two phase-type G | 0.020 | 0.46 | 1.75 | 0.020 | 0.001 | 5.15 | 21.68 | 2.93 | — | 0.130 | — |

Die size: 43 mmφ
Load for unwrinkling: 1 ton
Untreated material was coated with lubricant oil Johnson Wax #122, the lubricating resin coated material was not coated with lubricating oil.

The evaluation of mold galling property was made according to the following criteria:

⊚: No defect on steel sheet surface.

○: No defect on steel sheet surface; sliding face was slightly discolored.

Δ: Galling was slightly generated on the steel sheet surface.

×: A large number of linear galls were generated on the steel sheet surface.

(3) Evaluation of Degreasing Property

Degreasing Solution FC-4358 (produced by Nippon Parkerising, adjusted to a pH of 10.5, temperature: 40° C.) was sprayed on a specimen for 8 seconds and then washed with water. After drying, the film residual percentage was measured by the infrared spectroscopic analysis and evaluated.

⊚: No residual film.

○: Film residual percentage was 5% or less.

Δ: Film residual percentage was in excess of 5% but 10% or less.

×: Film residual percentage was in excess of 10%.

(4) Evaluation of Corrosion Resistance

The corrosion resistance against gasoline was evaluated. More specifically, a sample drawn into a flat bottom cylinder having a flange width of 80 mm, a diameter of 50 mm and a depth of 20 mm by a hydraulic molding machine was dipped in a test solution and a glass lid was fixed through a silicon rubber-made ring. After this test, the corroded state was observed with an eye. The sample used was degreased to remove the lubricating resin film after the drawing.

<Test Conditions>

Test Solution: gasoline+distilled water 10%+formic acid 200 ppm

Test Period: 5 weeks at 40° C.

<Criteria of Evaluation>

○: Red rust generation was less than 0.1%.

Δ: Red rust generation was from 0.1% to less than 5%.

×: Red rust generation was 5% or more.

As seen in Tables 2 and 3, the soluble lubricating surface-treated stainless steel sheets according to the present invention all exhibit excellent shapability and, after working, have high corrosion resistance and good film removability and is retarded to generate gases.

TABLE 2

Evaluation Results

|  | No. | Kind of Stainless Steel Sheet | Amount of Chromate Attached (mg/m$^2$) | Kind of Lubricating Film Resin |
| --- | --- | --- | --- | --- |
| Invention | 1 | Austenite-type A | untreated | Urethane A |
|  | 2 | Austenite-type B | untreated | Urethane A |
|  | 3 | Austenite-type C | untreated | Urethane A |
|  | 4 | Austenite-type D | untreated | Urethane A |
|  | 5 | Ferrite-type E | untreated | Urethane A |
|  | 6 | Ferrite-type F | untreated | Urethane A |
|  | 7 | Two phase-type G | untreated | Urethane A |
|  | 8 | Ferrite-type E | untreated | PEG-A |
|  | 9 | Ferrite-type E | untreated | PEG-B |
|  | 10 | Ferrite-type E | untreated | PPG |
|  | 11 | Ferrite-type E | untreated | PVA |
|  | 12 | Ferrite-type E | untreated | Acryl |
|  | 13 | Ferrite-type E | untreated | Urethane A |
|  | 14 | Ferrite-type E | untreated | Urethane A |
|  | 15 | Ferrite-type E | untreated | Urethane A |
|  | 16 | Ferrite-type E | untreated | Urethane A |
|  | 17 | Ferrite-type E | untreated | Urethane A |
|  | 18 | Ferrite-type E | untreated | Urethane A |
|  | 19 | Ferrite-type E | untreated | Urethane A |
|  | 20 | Ferrite-type E | untreated | Urethane B |
|  | 21 | Ferrite-type E | untreated | Urethane C |
|  | 22 | Ferrite-type E | untreated | Urethane A |
|  | 23 | Austenite-type A | untreated | Urethane B |
|  | 24 | Austenite-type A | untreated | Urethane C |
|  | 25 | Ferrite-type E | untreated | Urethane D |
|  | 26 | Ferrite-type E | untreated | Urethane D |
| Comparative Example | 1 | Austenite-type A | untreated | untreated |
|  | 2 | Austenite-type B | untreated | untreated |
|  | 3 | Austenite-type C | untreated | untreated |
|  | 4 | Austenite-type D | untreated | untreated |
|  | 5 | Ferrite-type E | untreated | untreated |
|  | 6 | Ferrite-type F | untreated | untreated |
|  | 7 | Two phase-type G | untreated | untreated |

TABLE 2-continued

Evaluation Results

Kind of Solid Lubricant and Composition

| | No. | PE Wax A Amount Added (%) | PE Wax B Amount Added (%) | PTFE Wax Amount Added (%) | Paraffin Wax Amount Added (%) | Calcium Stearate Wax Amount Added (%) | Silica Amount Added (%) | Film Thickness (μm) |
|---|---|---|---|---|---|---|---|---|
| Invention | 1 | 10 | | | | | 0 | 1.0 |
| | 2 | 10 | | | | | 0 | 1.0 |
| | 3 | 10 | | | | | 0 | 1.0 |
| | 4 | 10 | | | | | 0 | 1.0 |
| | 5 | 10 | | | | | 0 | 1.0 |
| | 6 | 10 | | | | | 0 | 1.0 |
| | 7 | 10 | | | | | 0 | 1.0 |
| | 8 | 10 | | | | | 0 | 1.0 |
| | 9 | 10 | | | | | 0 | 1.0 |
| | 10 | 10 | | | | | 0 | 1.0 |
| | 11 | 10 | | | | | 0 | 1.0 |
| | 12 | 10 | | | | | 0 | 1.0 |
| | 13 | | 10 | | | | 0 | 1.0 |
| | 14 | | | 10 | | | 0 | 1.0 |
| | 15 | | | | 10 | | 0 | 1.0 |
| | 16 | | | | | 10 | 0 | 1.0 |
| | 17 | 10 | | | | | 10 | 1.0 |
| | 18 | 15 | | | | | 0 | 3.0 |
| | 19 | 10 | | | | | 0 | 2.0 |
| | 20 | 10 | | | | | 0 | 1.0 |
| | 21 | 10 | | | | | 0 | 1.0 |
| | 22 | 10 | | | | | 0 | 0.5 |
| | 23 | 10 | | | | | 0 | 5.0 |
| | 24 | 10 | | | | | 0 | 1.0 |
| | 25 | 10 | | | | | 0 | 1.0 |
| | 26 | | 10 | | | | 0 | 1.0 |
| Comparative Example | 1 | | | | | | | |
| | 2 | | | | | | | |
| | 3 | | | | | | | |
| | 4 | | | | | | | |
| | 5 | | | | | | | |
| | 6 | | | | | | | |
| | 7 | | | | | | | |

| | No. | Glass Transition Temperature (°C) | LDR | Evaluation Results of Mold Galling Property room temperature | Evaluation Results of Mold Galling Property 100° C. | Evaluation of Degreasing Property, Film Residual Percentage after Degreasing with Alkali | Corrosion Resistance |
|---|---|---|---|---|---|---|---|
| Invention | 1 | 200 | 2.22 | ⊙ | ⊙ | ⊙ | ○ |
| | 2 | 200 | 2.22 | ⊙ | ⊙ | ⊙ | ○ |
| | 3 | 200 | 2.31 | ⊙ | ⊙ | ⊙ | ○ |
| | 4 | 200 | 2.20 | ⊙ | ⊙ | ⊙ | ○ |
| | 5 | 200 | 2.29 | ⊙ | ⊙ | ⊙ | ○ |
| | 6 | 200 | 2.38 | ⊙ | ⊙ | ⊙ | ○ |
| | 7 | 200 | 2.11 | ⊙ | ⊙ | ⊙ | ○ |
| | 8 | — | 2.28 | ○ | Δ | ⊙ | ○ |
| | 9 | — | 2.28 | ○ | Δ | ⊙ | ○ |
| | 10 | — | 2.28 | ○ | Δ | ⊙ | ○ |
| | 11 | — | 2.28 | ○ | Δ | ⊙ | ○ |
| | 12 | 85 | 2.28 | ⊙ | Δ | ○ | ○ |
| | 13 | 200 | 2.29 | ⊙ | ⊙ | ⊙ | ○ |
| | 14 | 200 | 2.28 | ⊙ | ⊙ | ⊙ | ○ |
| | 15 | 200 | 2.27 | ⊙ | ⊙ | ⊙ | ○ |
| | 16 | 200 | 2.27 | ⊙ | ⊙ | ⊙ | ○ |
| | 17 | 200 | 2.29 | ⊙ | ⊙ | ⊙ | ○ |
| | 18 | 200 | 2.31 | ⊙ | ⊙ | ⊙ | ○ |
| | 19 | 200 | 2.29 | ⊙ | ⊙ | ⊙ | ○ |
| | 20 | 170 | 2.30 | ⊙ | ⊙ | ⊙ | ○ |
| | 21 | 150 | 2.29 | ⊙ | ⊙ | ⊙ | ○ |
| | 22 | 200 | 2.28 | ⊙ | ⊙ | ⊙ | ○ |
| | 23 | 170 | 2.25 | ⊙ | ⊙ | ⊙ | ○ |
| | 24 | 150 | 2.22 | ⊙ | ⊙ | ⊙ | ○ |

TABLE 2-continued

| | | | | Evaluation Results | | | | |
|---|---|---|---|---|---|---|---|---|
| | | 25 | 200 | 2.30 | ◉ | ◉ | ◉ | ○ |
| | | 26 | 200 | 2.31 | ◉ | ◉ | ◉ | ○ |
| Comparative | | 1 | | 2.11 | Δ | Δ | — | ○ |
| Example | | 2 | | 2.10 | Δ | Δ | — | ○ |
| | | 3 | | 2.20 | Δ | Δ | — | ○ |
| | | 4 | | 2.10 | Δ | Δ | — | ○ |
| | | 5 | | 2.19 | Δ | Δ | — | ○ |
| | | 6 | | 2.25 | Δ | Δ | — | ○ |
| | | 7 | | 2.00 | Δ | Δ | — | ○ |

Resin:
PEG-A: polyethylene glycol (molecular weight: 20,000)
PEG-B: isocyanate-modified polyethylene glycol (molecular weight: 60,000
PPG: polypropylene glycol (molecular weight: 20,000)
PVA: polyvinyl alcohol (complete saponification type)
Acryl: a mixture of acrylic acid-styrene-maleic acid
Urethane A to D: Urethane Compositions A to D described in Examples.
Kind of solid lubricant:
PE Wax A: low density polyethylene wax, softening point: 110° C., average particle size: 4.0 μm
PE Wax B: low density polyethylene wax, softening point: 110° C., average particle size: 2.5 μm
PTFE Wax: polytetrafluoroethylene wax, average particle size: 3.5 μm
Paraffin wax: synthetic paraffin wax, melting point: 105° C., average particle size: 5.0 μm
Calcium stearate wax: average particle size: 2.0 μm
Silica:
Colloidal silica: average particle size: 10 to 20 nm, pH: 8.6, heating residue: about 20%

TABLE 3

| | | | Evaluation Results | |
|---|---|---|---|---|
| | No. | Kind of Stainless Steel Sheet | Amount of Chromate Attached (mg/m²) | Kind of Lubricating Film Resin |
| Invention | 27 | Austenite-type A | 20 | Urethane A |
| | 28 | Austenite-type B | 20 | Urethane A |
| | 29 | Austenite-type C | 20 | Urethane A |
| | 30 | Austenite-type D | 20 | Urethane A |
| | 31 | Ferrite-type E | 20 | Urethane A |
| | 32 | Ferrite-type F | 20 | Urethane A |
| | 33 | Two phase-type G | 20 | Urethane A |
| | 34 | Ferrite-type E | 20 | PEG-A |
| | 35 | Ferrite-type E | 20 | PEG-B |
| | 36 | Ferrite-type E | 20 | PPG |
| | 37 | Ferrite-type E | 20 | PVA |
| | 38 | Ferrite-type E | 20 | Acryl |
| | 39 | Ferrite-type E | 20 | Urethane A |
| | 40 | Ferrite-type E | 20 | Urethane A |
| | 41 | Ferrite-type E | 20 | Urethane A |
| | 42 | Ferrite-type E | 20 | Urethane A |
| | 43 | Ferrite-type E | 20 | Urethane A |
| | 44 | Ferrite-type E | 20 | Urethane A |
| | 45 | Ferrite-type E | 20 | Urethane A |
| | 46 | Ferrite-type E | 20 | Urethane B |
| | 47 | Ferrite-type E | 20 | Urethane C |
| | 48 | Ferrite-type E | 20 | Urethane A |
| | 49 | Austenite-type A | 20 | Urethane B |
| | 50 | Austenite-type A | 20 | Urethane C |
| | 51 | Ferrite-type E | 20 | Urethane D |
| | 52 | Ferrite-type E | 20 | Urethane D |
| Comparative | 1 | Austenite-type A | untreated | untreated |
| Example | 2 | Austenite-type B | untreated | untreated |
| | 3 | Austenite-type C | untreated | untreated |
| | 4 | Austenite-type D | untreated | untreated |
| | 5 | Ferrite-type E | untreated | untreated |
| | 6 | Ferrite-type F | untreated | untreated |
| | 7 | Two phase-type G | untreated | untreated |

TABLE 3-continued

Evaluation Results

Kind of Solid Lubricant and Composition

| | No. | PE Wax A Amount Added (%) | PE Wax B Amount Added (%) | PTFE Wax Amount Added (%) | Paraffin Wax Amount Added (%) | Calcium Stearate Wax Amount Added (%) | Silica Amount Added (%) | Film Thickness (μm) |
|---|---|---|---|---|---|---|---|---|
| Invention | 27 | 10 | | | | | 0 | 1.0 |
| | 28 | 10 | | | | | 0 | 1.0 |
| | 29 | 10 | | | | | 0 | 1.0 |
| | 30 | 10 | | | | | 0 | 1.0 |
| | 31 | 10 | | | | | 0 | 1.0 |
| | 32 | 10 | | | | | 0 | 1.0 |
| | 33 | 10 | | | | | 0 | 1.0 |
| | 34 | 10 | | | | | 0 | 1.0 |
| | 35 | 10 | | | | | 0 | 1.0 |
| | 36 | 10 | | | | | 0 | 1.0 |
| | 37 | 10 | | | | | 0 | 1.0 |
| | 38 | 10 | | | | | 0 | 1.0 |
| | 39 | | 10 | | | | 0 | 1.0 |
| | 40 | | | 10 | | | 0 | 1.0 |
| | 41 | | | | 10 | | 0 | 1.0 |
| | 42 | | | | | 10 | 0 | 1.0 |
| | 43 | 10 | | | | | 10 | 1.0 |
| | 44 | 15 | | | | | 0 | 3.0 |
| | 45 | 10 | | | | | 0 | 2.0 |
| | 46 | 10 | | | | | 0 | 1.0 |
| | 47 | 10 | | | | | 0 | 1.0 |
| | 48 | 10 | | | | | 0 | 0.5 |
| | 49 | 10 | | | | | 0 | 5.0 |
| | 50 | 10 | | | | | 0 | 1.0 |
| | 51 | 10 | | | | | 0 | 1.0 |
| | 52 | | 10 | | | | 0 | 1.0 |
| Comparative Example | 1 | | | | | | | |
| | 2 | | | | | | | |
| | 3 | | | | | | | |
| | 4 | | | | | | | |
| | 5 | | | | | | | |
| | 6 | | | | | | | |
| | 7 | | | | | | | |

| | No. | Glass Transition Temperature (° C.) | LDR | Evaluation Results of Mold Galling Property room temperature | Evaluation Results of Mold Galling Property 100° C. | Evaluation of Degreasing Property, Film Residual Percentage after Degreasing with Alkali | Corrosion Resistance |
|---|---|---|---|---|---|---|---|
| Invention | 27 | 200 | 2.23 | ◉ | ◉ | ◉ | ○ |
| | 28 | 200 | 2.22 | ◉ | ◉ | ◉ | ○ |
| | 29 | 200 | 2.31 | ◉ | ◉ | ◉ | ○ |
| | 30 | 200 | 2.20 | ◉ | ◉ | ◉ | ○ |
| | 31 | 200 | 2.29 | ◉ | ◉ | ◉ | ○ |
| | 32 | 200 | 2.38 | ◉ | ◉ | ◉ | ○ |
| | 33 | 200 | 2.11 | ◉ | ◉ | ◉ | ○ |
| | 34 | — | 2.28 | ○ | Δ | ◉ | ○ |
| | 35 | — | 2.28 | ○ | Δ | ◉ | ○ |
| | 36 | — | 2.28 | ○ | Δ | ◉ | ○ |
| | 37 | — | 2.28 | ○ | Δ | ◉ | ○ |
| | 38 | 85 | 2.26 | ◉ | Δ | ○ | ○ |
| | 39 | 200 | 2.29 | ◉ | ◉ | ◉ | ○ |
| | 40 | 200 | 2.28 | ◉ | ◉ | ◉ | ○ |
| | 41 | 200 | 2.27 | ◉ | ◉ | ◉ | ○ |
| | 42 | 200 | 2.27 | ◉ | ◉ | ◉ | ○ |
| | 43 | 200 | 2.29 | ◉ | ◉ | ◉ | ○ |
| | 44 | 200 | 2.31 | ◉ | ◉ | ◉ | ○ |
| | 45 | 200 | 2.29 | ◉ | ◉ | ◉ | ○ |
| | 46 | 170 | 2.30 | ◉ | ◉ | ◉ | ○ |
| | 47 | 150 | 2.29 | ◉ | ◉ | ◉ | ○ |
| | 48 | 200 | 2.29 | ◉ | ◉ | ◉ | ○ |
| | 49 | 170 | 2.25 | ◉ | ◉ | ◉ | ○ |
| | 50 | 150 | 2.22 | ◉ | ◉ | ◉ | ○ |

TABLE 3-continued

| | | Evaluation Results | | | | | |
|---|---|---|---|---|---|---|---|
| | 51 | 200 | 2.30 | ◉ | ◉ | ◉ | ○ |
| | 52 | 200 | 2.31 | ◉ | ◉ | ◉ | ○ |
| Comparative | 1 | | 2.11 | Δ | Δ | — | ○ |
| Example | 2 | | 2.10 | Δ | Δ | — | ○ |
| | 3 | | 2.20 | Δ | Δ | — | ○ |
| | 4 | | 2.10 | Δ | Δ | — | ○ |
| | 5 | | 2.19 | Δ | Δ | — | ○ |
| | 6 | | 2.25 | Δ | Δ | — | ○ |
| | 7 | | 2.00 | Δ | Δ | — | ○ |

Resin:
PEG-A: polyethylene glycol (molecular weight: 20,000)
PEG-B: isocyanate-modified polyethylene glycol (molecular weight: 60,000
PPG: polypropylene glycol (molecular weight: 20,000)
PVA: polyvinyl alcohol (complete saponification type)
Acryl: a mixture of acrylic acid-styrene-maleic acid
Urethane A to D: Urethane Compositions A to D described in Examples.

Kind of solid lubricant:
PE Wax A: low density polyethylene wax, softening point: 110° C., average particle size: 4.0 μm
PE Wax B: low density polyethylene wax, softening point: 110° C., average particle size: 2.5 μm
PTFE Wax: polytetrafluoroethylene wax, average particle size: 3.5 μm
Paraffin wax: synthetic paraffin wax, melting point: 105° C., average particle size: 5.0 μm
Calcium stearate wax: average particle size: 2.0 μm Silica:
Colloidal silica: average particle size: 10 to 20 nm, pH: 8.6, heating residue: about 20%

According to the present invention, a soluble lubricating surface-treated stainless steel sheet with excellent shapability for fuel tanks and a method for producing a fuel tank can be provided and this greatly contributes to uses for fuel tanks. Accordingly, the industrial value of the present invention is very high.

What is claimed is:

1. A soluble lubricating surface-treated stainless steel sheet with excellent shapability for fuel tanks, comprising a substrate having on both surfaces or one surface thereof a soluble lubricating resin film consisting essentially of (A) a resin composition consisting of only a soluble polyurethane resin composition containing a carboxyl group or a sulfonic acid group within the molecule and having a glass transition point of 100° C. or more as a dry film and (B) a lubricating function-imparting agent in an amount of from 1 to 30% by mass based on said soluble polyurethane resin composition, said substrate being a ferrite-type stainless steel sheet.

2. A soluble lubricating surface-treated stainless steel sheet with excellent shapability for fuel tanks, comprising a substrate having on both surfaces or one surface thereof a soluble lubricating resin film consisting essentially of (A) a resin composition consisting of only a soluble polyurethane resin composition containing a carboxyl group or a sulfonic acid group within the molecule and having a glass transition point of 100° C. or more as a dry film, (B) a lubricating function-imparting agent in an amount of from 1 to 30% by mass based on said soluble polyurethane resin composition and (C) silica particles in an amount of 1 to 30% by mass based on said soluble polyurethane resin composition, said substrate being a ferrite-type stainless steel sheet.

3. The soluble lubricating surface-treated stainless steel sheet for fuel tanks as claimed in claim 1, wherein an amount of an acid group contained in (A) the soluble polyurethane resin composition for forming a soluble lubricating resin film has an acid value from 30 to 180.

4. The soluble lubricating surface-treated stainless steel sheet for fuel tanks as claimed in claim 2, wherein an amount of an acid group contained in (A) the soluble polyurethane resin composition for forming a soluble lubricating resin film has an acid value from 30 to 180.

5. The soluble lubricating surface-treated stainless steel sheet for fuel tanks as claimed in claim 1, wherein a neutralizer for an acid group contained in (A) the soluble polyurethane resin composition for forming a soluble lubricating resin film is sodium hydroxide or potassium hydroxide.

6. The soluble lubricating surface-treated stainless steel sheet for fuel tanks as claimed in claim 2, wherein a neutralizer for an acid group contained in (A) the soluble polyurethane resin composition for forming a soluble lubricating resin film is sodium hydroxide or potassium hydroxide.

7. The soluble lubricating surface-treated stainless steel sheet for fuel tanks as claimed in claim 1, wherein a component constituting (A) the soluble polyurethane resin composition for forming a soluble lubricating resin film is polyester polyol.

8. The soluble lubricating surface-treated stainless steel sheet for fuel tanks as claimed in claim 2, wherein a component constituting (A) the soluble polyurethane resin composition for forming a soluble lubricating resin film is polyester polyol.

9. The soluble lubricating surface-treated stainless steel sheet for fuel tanks as claimed in claim 1, wherein a component constituting (A) the soluble polyurethane resin composition for forming a soluble lubricating resin film is polyether polyol.

10. The soluble lubricating surface-treated stainless steel sheet for fuel tanks as claimed in claim 2, wherein a component constituting (A) the soluble polyurethane resin composition for forming a soluble lubricating resin film is polyether polyol.

11. The soluble lubricating surface-treated stainless steel sheet for fuel tanks as claimed in claim 1, wherein the lubricating function-imparting agent (B) comprises one or more members selected from the group consisting of polyolefin-based wax, fluorine-containing wax, paraffin-based wax and stearic acid-based wax.

12. The soluble lubricating surface-treated stainless steel sheet for fuel tanks as claimed in claim 2, wherein the lubricating function-imparting agent (B) comprises one or more members selected from the group consisting of polyolefin-based wax, fluorine-containing wax, paraffin-based wax and stearic acid-based wax.

13. The soluble lubricating surface-treated stainless steel sheet for fuel tanks as claimed in claim 1, wherein the substrate is a ferrite-type stainless steel sheet comprising, in % by mass:

C: 0.5% or less,
Si: 3% or less,
Mn: 5% or less,
P: 0.1% or less,
S: 0.05% or less,
Ni: 5% or less,
Cr: 9 to 30%,
N: 0.2% or less, and
Al: 0.001 to 5% with the balance being Fe and inevitable impurities.

14. The soluble lubricating surface-treated stainless steel sheet for fuel tanks as claimed in claim 2, wherein the substrate is a ferrite-type stainless steel sheet comprising, in % by mass:

C: 0.5% or less,
Si: 3% or less,
Mn: 5% or less,
P: 0.1% or less,
S: 0.05% or less,
Ni: 5% or less,
Cr: 9 to 30%,
N: 0.2% or less, and
Al: 0.001 to 5% with the balance being Fe and inevitable impurities.

15. The soluble lubricating surface-treated stainless steel sheet for fuel tanks as claimed in claim 13, wherein the substrate stainless steel sheet further comprises one or more of, in % by mass:

Mo: 0.01 to 8%,
Cu: 0.01 to 5%,
Ti: 0.01 to 1%,
Nb: 0.01 to 1%,
V: 0.01 to 1%,
Mg: 0.001 to 0.1%,
Ca: 0.001 to 0.1%,
B: 0.0005 to 0.05%, and
W: 0.01 to 5%.

16. The soluble lubricating surface-treated stainless steel sheet for fuel tanks as claimed in claim 14, wherein the substrate stainless steel sheet further comprises one or more of, in % by mass:

Mo: 0.01 to 8%,
Cu: 0.01 to 5%,
Ti: 0.01 to 1%,
Nb: 0.01 to 1%,
V: 0.01 to 1%,
Mg: 0.001 to 0.1%,
Ca: 0.001 to 0.1%,
B: 0.0005 to 0.05%, and
W: 0.01 to 5%.

* * * * *